(12) United States Patent
Ono (10) Patent No.: US 9,141,784 B2
(45) Date of Patent: Sep. 22, 2015

(54) PRINTING CONTROL PROGRAM, INFORMATION PROCESSING APPARATUS, PRINTING SYSTEM, AND PRINTING APPARATUS

(75) Inventor: Akiyoshi Ono, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 720 days.

(21) Appl. No.: 13/337,524

(22) Filed: Dec. 27, 2011

(65) Prior Publication Data

US 2012/0176641 A1 Jul. 12, 2012

(30) Foreign Application Priority Data

Jan. 6, 2011 (JP) .................................. 2011-001196

(51) Int. Cl.
| | |
|---|---|
| *G06K 15/00* | (2006.01) |
| *G06F 3/12* | (2006.01) |
| *G06F 21/00* | (2013.01) |
| *G06F 21/51* | (2013.01) |
| *G06F 21/60* | (2013.01) |

(52) U.S. Cl.
CPC .............. *G06F 21/51* (2013.01); *G06F 21/608* (2013.01)

(58) Field of Classification Search
CPC .................................................... G06F 21/608
See application file for complete search history.

(56) References Cited

U.S. PATENT DOCUMENTS

| | | | |
|---|---|---|---|
| 2005/0125676 A1* | 6/2005 | Fujiwara et al. | ............... 713/182 |
| 2006/0279773 A1* | 12/2006 | Sakurai et al. | ............... 358/1.15 |
| 2008/0068655 A1 | 3/2008 | Kimura | |
| 2009/0213422 A1 | 8/2009 | Ono | |

FOREIGN PATENT DOCUMENTS

| | | |
|---|---|---|
| JP | 9-62849 | 3/1997 |
| JP | 2002-152458 | 5/2002 |
| JP | 2008-97574 | 4/2008 |

OTHER PUBLICATIONS

Office Action issued Aug. 19, 2014 in Japanese Patent Application No. 2011-001196.

* cited by examiner

*Primary Examiner* — Marivelisse Santiago Cordero
*Assistant Examiner* — Temitayo Folayan
(74) *Attorney, Agent, or Firm* — Oblon, McClelland, Maier & Neustadt, L.L.P.

(57) ABSTRACT

An information processing apparatus which implements a printing control function for generating printing control information for causing an image forming apparatus to execute printing outputting is disclosed. The information processing apparatus includes a core unit and an extension unit which can be added after the core unit is installed. The information processing apparatus further includes a launch processing unit which launches the extension unit; an extension function operation information requesting unit; an extension function operation information encrypting unit; an extension function operation information decrypting unit; and a printing control information generating unit.

14 Claims, 13 Drawing Sheets

| FUNCTION NAME | ARGUMENT | RETURN VALUE | EXPLANATION |
|---|---|---|---|
| OpenPlugin() | void | HANDLE | OPEN PLUG-IN RETURN HANDLE IF SUCCESSFUL IN OPENING |
| GetInterface() | HANDLE handle "STARTING ADDRESS" "FILE SIZE" | BOOL | CALL BACK PLUG-IN OBTAIN ENCRYPTED FUNCTION TABLE |
| ClosePlugin() | HANDLE handle | void | CLOSE PLUG-IN |

FIG.4

| address | 00 | 01 | 02 | 03 | 04 | 05 | 06 | 07 | 08 | 09 | 0A | 0B | 0C | 0D | 0E | 0F |
|---|---|---|---|---|---|---|---|---|---|---|---|---|---|---|---|---|
| 0000:0000 | 31 | 35 | 3A | 34 | 33 | 3A | 31 | 39 | 2E | 36 | 38 | 38 | 3A | 20 | 45 | 78 |
| 0000:0010 | 63 | 65 | 70 | 74 | 69 | 6F | 6E | 20 | 77 | 61 | 73 | 20 | 72 | 61 | 69 | 73 |
| 0000:0020 | 65 | 64 | 2E | 20 | 52 | 65 | 61 | 73 | 6F | 6E | 20 | 3D | 20 | 4E | 55 | 4C |
| 0000:0030 | 4C | 20 | 45 | 58 | 43 | 45 | 50 | 54 | 49 | 4F | 4E | 20 | 28 | 50 | 72 | 6E |
| 0000:0040 | 50 | 61 | 67 | 65 | 53 | 74 | 61 | 72 | 74 | 28 | 29 | 20 | 63 | 6F | 6D | 6D |
| 0000:0050 | 61 | 6E | 64 | 2E | 63 | 70 | 70 | 20 | 6C | 69 | 6E | 65 | 20 | 33 | 30 | 38 |
| 0000:0060 | 29 | 0D | 0A | 31 | 35 | 3A | 34 | 33 | 3A | 31 | 39 | 2E | 36 | 39 | 30 | 3A |
| 0000:0070 | 20 | 45 | 78 | 63 | 65 | 70 | 74 | 69 | 6F | 6E | 20 | 77 | 61 | 73 | 20 | 72 |
| 0000:0080 | 61 | 69 | 73 | 65 | 64 | 2E | 20 | 52 | 65 | 61 | 73 | 6F | 6E | 20 | 3D | 20 |
| 0000:0090 | 4E | 55 | 4C | 4C | 20 | 45 | 58 | 43 | 45 | 50 | 54 | 49 | 4F | 4E | 20 | 28 |

Background Art

FIG.8

Background Art

FIG.9

| FUNCTION NAME | ARGUMENT | RETURN VALUE | EXPLANATION |
|---|---|---|---|
| OpenPlugin() | void | HANDLE | OPEN PLUG-IN RETURN HANDLE IF SUCCESSFUL IN OPENING |
| GetInterface() | HANDLE handle LPPUGIN_IF_TBL table | BOOL | OBTAIN PLUG-IN INTERFACE FUNCTION (CALL BACK FUNCTION) |
| ClosePlugin() | HANDLE handle | void | CLOSE PLUG-IN |

Background Art

FIG.10

```
typedef struct {
    LPNEED_JIMON         NeedJimon;
    LPNEED_WATERMARK     NeedWatermark;
} PLUGIN_IF_TBL, *LPPLUGIN_IF_TBL;
```

Background Art

FIG.11

| FUNCTION NAME | ARGUMENT | RETURN VALUE | EXPLANATION |
|---|---|---|---|
| NeedJimon() | PDEVMODE devmode | BOOL | DETERMINE WHETHER WOVEN PATTERN IS NEEDED |
| NeedWatermark() | PDEVMODE devmode | BOOL | DETERMINE WHETHER LETTER STAMP IS NEEDED |

Background Art

FIG.12

Background Art

FIG.13

Background Art

PRINTING CONTROL PROGRAM, INFORMATION PROCESSING APPARATUS, PRINTING SYSTEM, AND PRINTING APPARATUS

TECHNICAL FIELD

The present invention relates to printing control programs, information processing apparatuses, printing systems, and printing apparatuses and more specifically relates to improving security of a function which is additionally implemented in a printing control program.

BACKGROUND ART

In recent years, there has been a trend toward promoting digitization of information, so that image processing apparatuses such as a scanner which is used for digitization of documents, a fax machine, a printer which is used for outputting digitized information, etc., are becoming indispensable equipment units. These image processing apparatuses are often configured as multi-functional machines which are usable as a printer, a fax machine, a scanner, and a copier by including therein an imaging function, an image forming function, a communications function, etc.

Of such image processing apparatuses, in a printing apparatus which is used for outputting digitized documents, a printer is generally used which executes printing outputting based on a printing job generated in an information processing apparatus such as a PC (personal computer), etc. Then, as a software program which implements functions for generating the printing job to be input to the printer, a printer driver which corresponds to respective printer functions is generally installed in the information processing apparatus.

Then, in a related-art printer driver, a method is used for extending functions in a form called a plug-in while leaving a program of a main body that is already installed without re-installing an updated program (see Patent document 1, for example).

Figure 7:
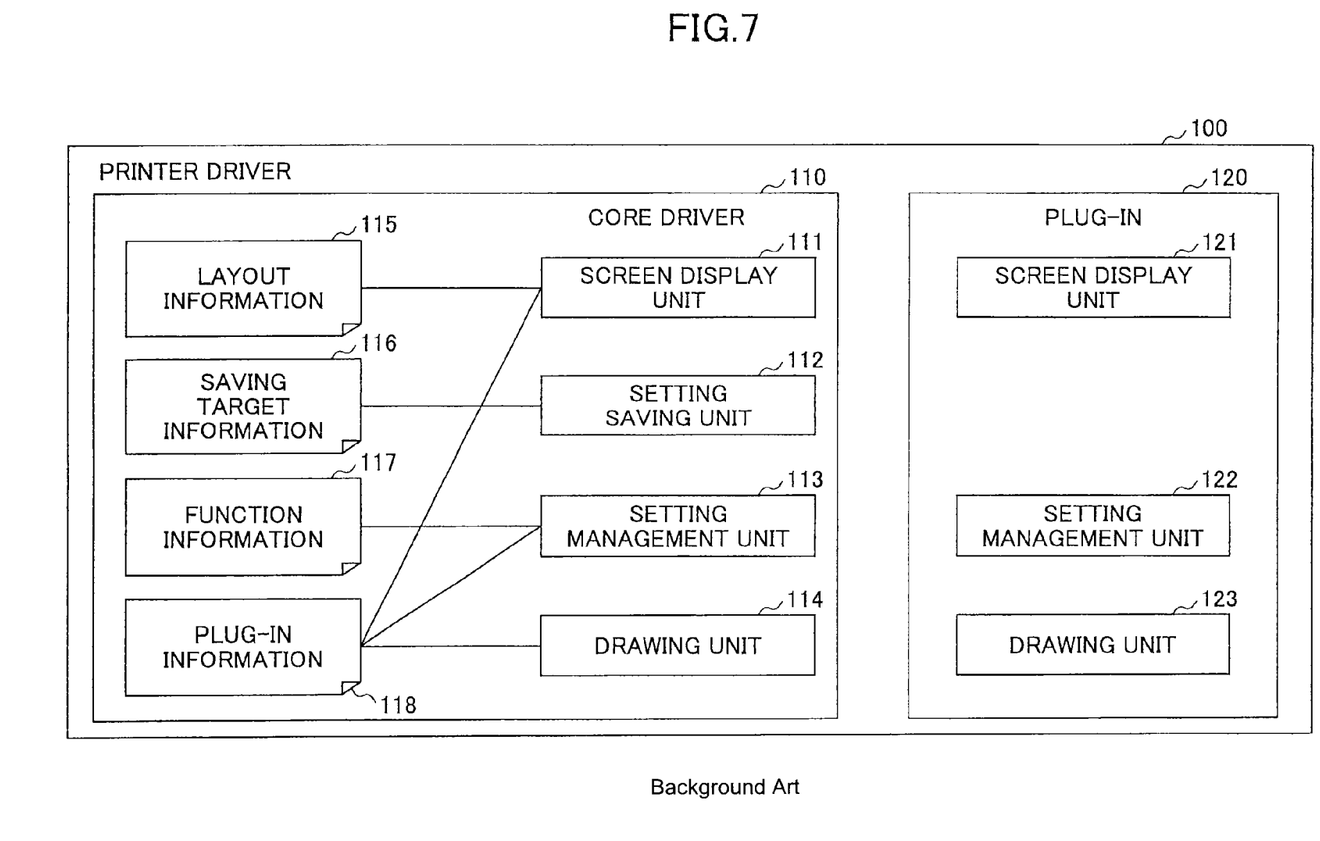
FIG. 7 is a diagram illustrating a functional configuration of the printer driver according to the related art.

Here, FIG. 7 is a diagram illustrating a configuration of a printer driver 100 in general. As shown in FIG. 7, in the printer driver 100, which is divided into a core driver 110 and a plug-in 120, functions are implemented by calling the plug-in 120 from the core driver 110 side.

Figure 8:
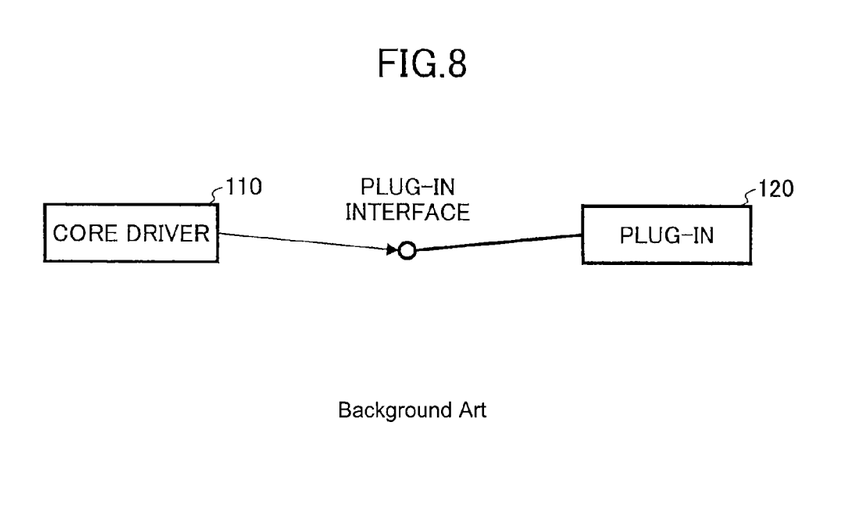
FIG. 8 is a conceptual diagram illustrating a mode of calling a plug-in according to the related art.

FIG. 8 is a diagram conceptually illustrating a process when the plug-in 120 is called from the core driver 110 side. As shown in FIG. 8, the plug-in 120 has a plug-in interface open to the public, so that the core driver 110 side uses the publicly-open interface to utilize the function of the plug-in 120.

Figure 9:
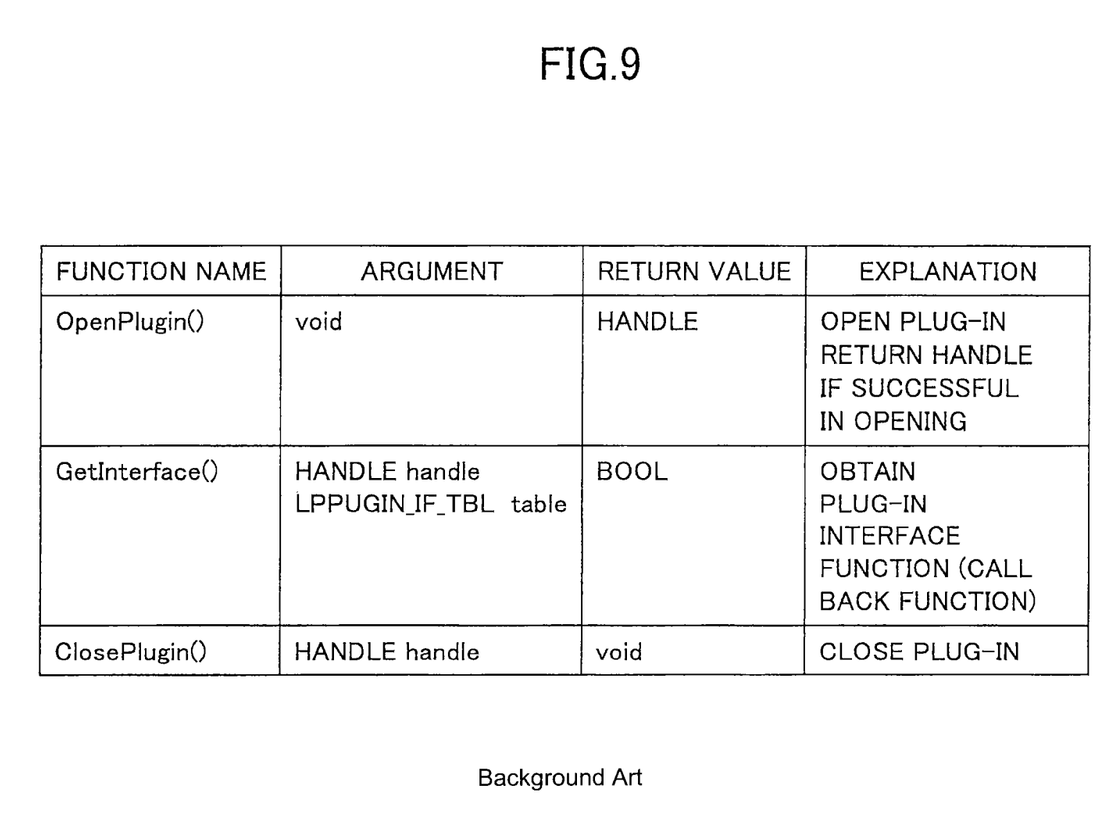
FIG. 9 is a diagram illustrating an example of a plug-in interface according to the related art.
Figure 10:
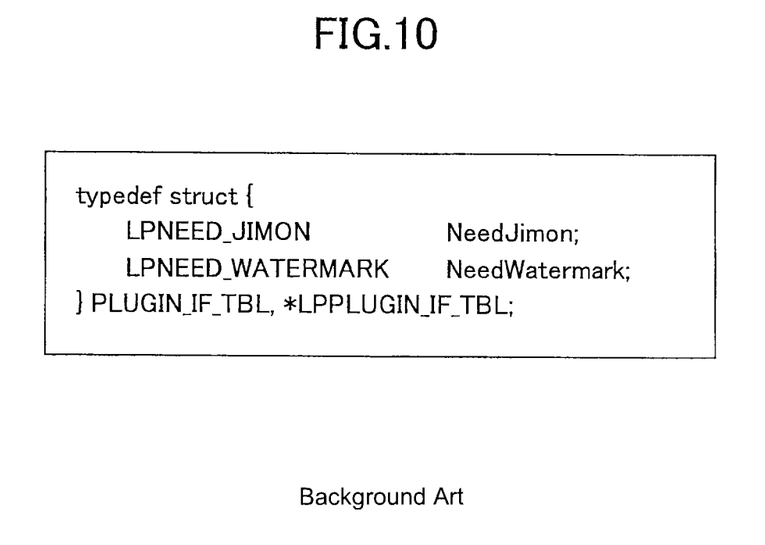
FIG. 10 is a diagram illustrating an example of the interface function table.

FIG. 9 is a diagram illustrating an example of a publicly-open interface. The core driver 110 starts a plug-in process with an "OpenPlugin( )" command as shown in FIG. 9, and obtains from the plug-in 120 side an interface function table as shown in FIG. 10 with a "GetInterface( )" command. In this way, the core driver 110 may use an interface function which is described in the interface function table to operate the function of the plug-in 120. Subsequently, the plug-in process is completed with a "ClosePlugin( )" command.

Figure 11:
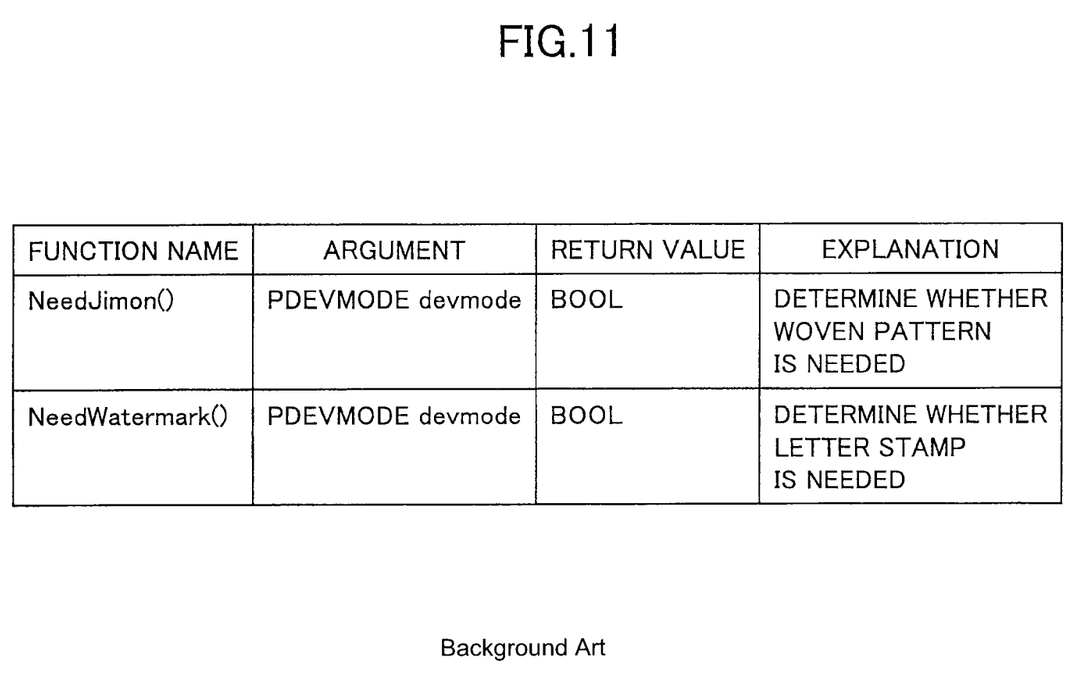
FIG. 11 is a diagram illustrating an example of an interface function.
Figure 12:
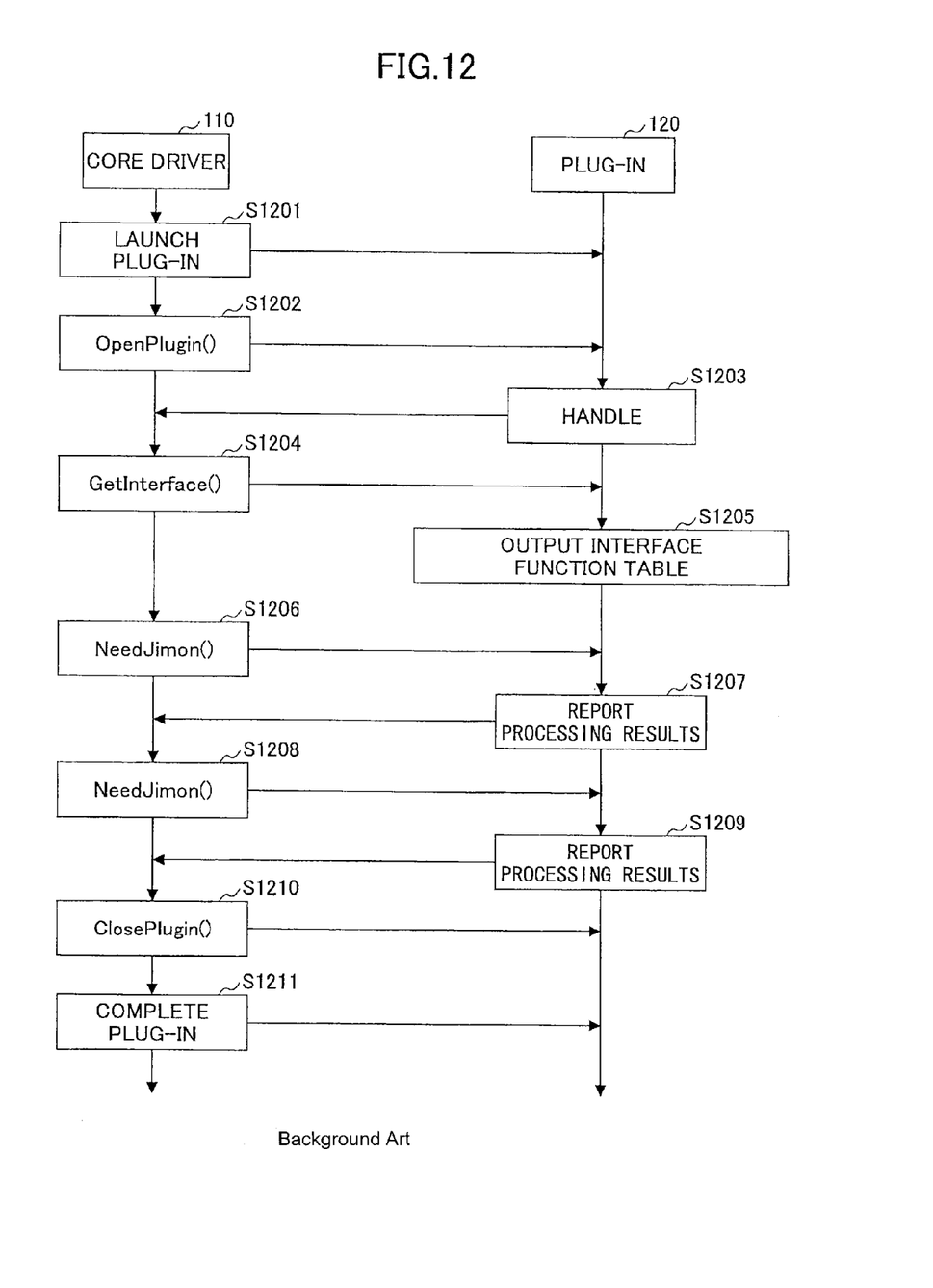
FIG. 12 is a sequence diagram illustrating an operation of the printing system according to the related art.

As shown in FIG. 9, as an argument of the "GetInterface( )" command, the interface function table such as an "LPPLUG-IN_IF_TBL table" is designated which is included in a DLL (Dynamic Link Library) file which makes up the plug-in 120. In this way, the core driver 110 may obtain the interface function as shown in FIG. 10 and utilize an interface of the plug-in 120 as shown in FIG. 11. FIG. 12 is a sequence diagram illustrating a process between the plug-in 120 side and the core driver 110 side in a series of operations as described above.

Commands such as "NeedJimon( )" and "NeedWatermark( )", etc., that are shown in FIGS. 10 and 11 are commands related to drawing, and the interface function table shown in FIG. 11 is used by a drawing unit 114. Moreover, of operations shown in FIG. 12, a process on the core driver 110 side is a process of the drawing unit 114.

Patent document

Patent Document 1 JP2008-97574A

Figure 13:
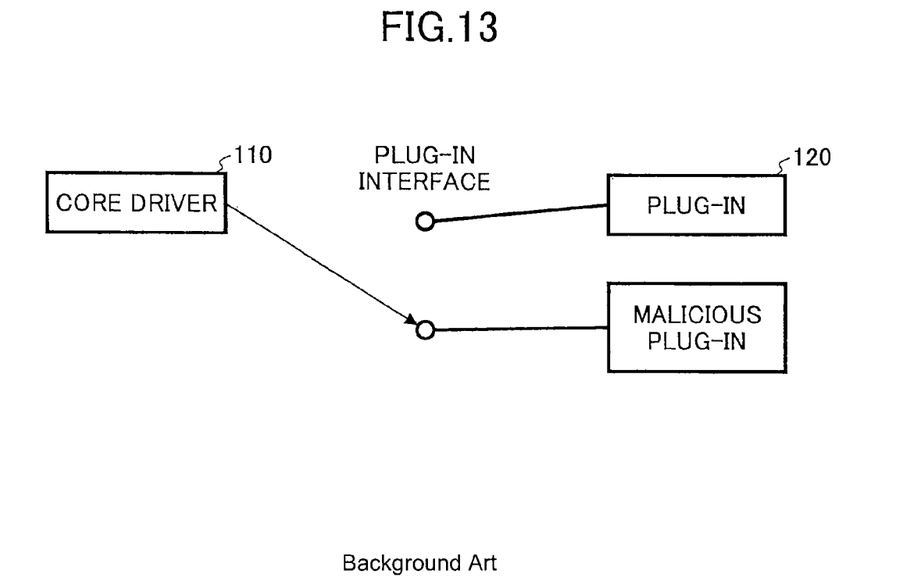
FIG. 13 is a conceptual diagram illustrating a mode of takeover by a malicious plug-in in calling the plug-in according to the related art.

In the configuration of the related-art plug-in as described above, the interface function table as shown in FIG. 10 is publicly open, so that there is a possibility of the plug-in being replaced with a malicious dummy DLL (Dynamic Link Library). FIG. 13, which is a diagram corresponding to FIG. 8, is a diagram which conceptually illustrates that a valid plug-in is replaced with the malicious dummy DLL.

As shown in FIG. 13, a file name of a DLL file which has the same interface function as a valid plug-in 120 and which is to be a plug-in thereof may be used, so that the valid plug-in may be taken over by a malicious plug-in. For example, when a security-related plug-in is taken over to be invalidated, security to be applied to a document is not applied, leading to a problem of leakage of information, etc.

DISCLOSURE OF THE INVENTION

In light of the problems as described above, an object of the present invention is to improve security of functions which are additionally implemented in correspondence with functional expansion of a printing control program for executing image formation outputting to an image forming apparatus.

According to an embodiment of the present invention, an information processing apparatus is provided which implements a printing control function for generating printing control information for causing an image forming apparatus to execute printing, the information processing apparatus comprising a core unit installed therein and an extension unit which can be added to the installed core unit, the information processing apparatus further including a launch processing unit which launches the extension unit; an extension function operation information requesting unit which requests the extension unit for extension function operation information for operating a function implemented in the extension unit; an extension function operation information encrypting unit which encrypts and outputs the extension function operation information in response to a request for the extension function operation information; an extension function operation information decrypting unit which decrypts the encrypted and outputted extension function operation information; and a printing control information generating unit which generates printing control information for operating the function implemented in the extension unit based on the decrypted extension function operation information to cause the image forming apparatus to execute printing.

The embodiment of the present invention makes it possible to improve security of functions which are additionally implemented in correspondence with functional expansion of a printing control program for causing the image forming apparatus to execute the image forming.

BRIEF DESCRIPTION OF THE DRAWINGS

Other objects, features, and advantages of the present invention will become more apparent from the following detailed descriptions when read in conjunction with the accompanying drawings, in which.

BEST MODE FOR CARRYING OUT THE INVENTION

Below, embodiments of the present invention are described in detail with reference to drawings. In the embodiments, a printing system, as an example, is described which includes a PC (personal computer), which is an information processing apparatus in which a printer driver is installed, and a printer, which is an image forming apparatus which executes printing according to a printing job generated by the printer driver. The image forming apparatus does not have to be a printer, but may be an apparatus which executes image forming based on a printing job generated by the printer driver installed in the PC.

Figure 1:
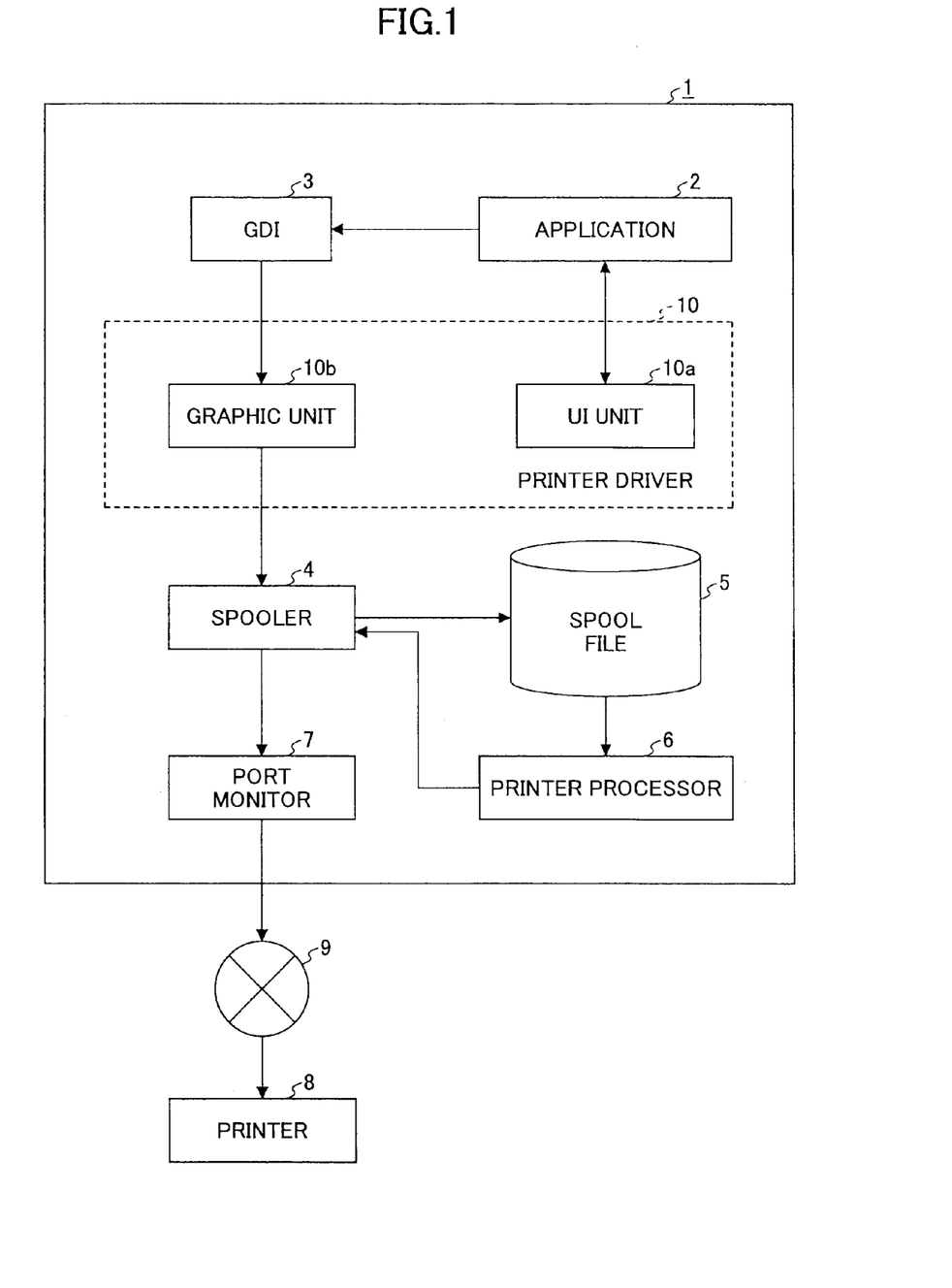
FIG. 1 is a block diagram illustrating a functional configuration of a printing system according to an embodiment of the present invention.

FIG. 1 is a block diagram showing a functional configuration of the printing system according to the present embodiment. As shown in FIG. 1, the printing system according to the present embodiment includes a PC 1 and a printer 8 connected via a network 9. In the PC 1, an installed application 2 which operates on an OS (Operating System) to provide functions such as document creation and image editing, etc., and provide information to be a source of an image to be printed in response to an operation of a user.

In response to the operation of the user, the application 2 launches a UI (User Interface) unit 10a and obtains, in an information format called a DEVMODE structure, setting information on printing that is set via a GUI (graphical UI) of the UI unit 10a.

Then, when a printing execution command is input by a user operation to the application 2 or a UI unit 10a launched by the application 2, the application 2 launches a GDI (graph- ics device interface) 3 and transfers information on an image to be output and the DEVMODE structure which is set via the UI unit 10a.

The GDI 3 is generally a drawing engine which is embedded in an OS, which is generally basic software. The GDI 3 launches a graphic unit 10b of the printer driver 10 via a DDI (device driver interface) and transfers the process.

The graphic unit 10b of the printer driver 10 converts image data output as an OS internal command by the GDI 3 to data having a PDL (page description language) format, a data format which can be processed by the printer 8 in which printing is executed. The PDL format data is printing control information for causing the printer 8 to execute printing. The graphic unit 10b successively transfers data converted to the PDL format to a spooler 4.

The spooler 4 primarily stores the PDL format data generated by the graphic unit 10b in a storage medium such as a spool file 5. In this way, the printer driver 10 may transfer the generated PDL data to the spooler 4 to immediately move to the following process even when the printer 8 cannot accept the PDL data after the graphic unit 10b has generated the PDL data in the printer driver 10, making it possible to make the process more efficient.

The PDL data stored in the storage medium as the spool file 5 is again transferred to the spooler 4 via a printer processor 6 and transmitted to the printer 8 via a network 9 by a port monitor 7.

Figure 2:
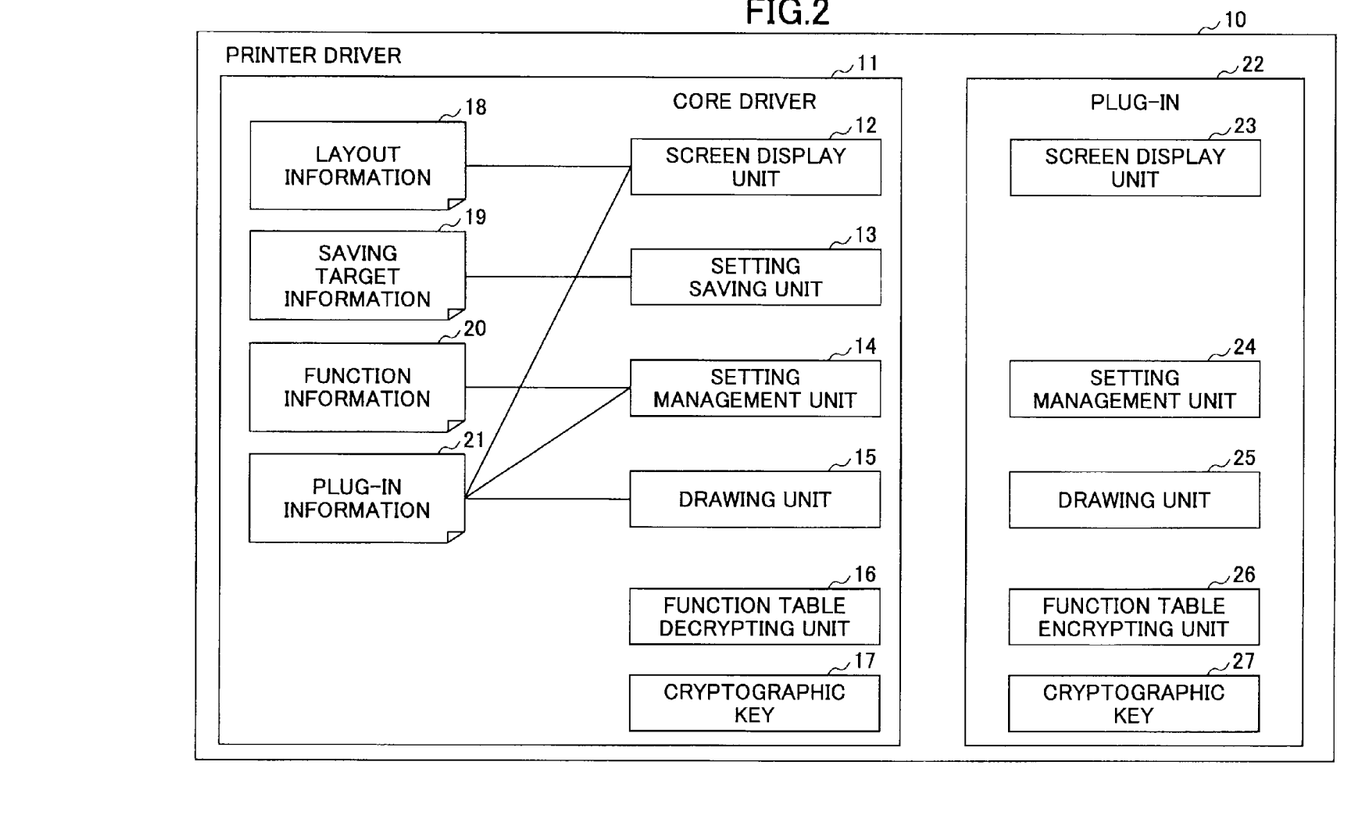
FIG. 2 is a diagram illustrating a functional configuration of a printer driver according to the embodiment of the present invention.

Next, a functional configuration of the printer driver according to the present embodiment is described with reference to FIG. 2. As shown in FIG. 2, the printer driver 10, which is divided into a core driver 11 which is a core unit configured within the PC 1 by installing the printer driver 10, and a plug-in 22, an extension unit which may be added after the installing, is arranged to implement the function thereof by calling the plug-in 22 from the core driver 11 side.

As shown in FIG. 2, the core driver 11 includes a screen display unit 12, a setting saving unit 13, a setting management unit 14, a drawing unit 15, and a function table decrypting unit 16. The screen display unit 12 displays on a display monitor the GUI of the printer driver 10 based on layout information 18 stored in the storage medium. Moreover, based on information on screen displaying out of plug-in information 21 stored in the storage medium, the screen display unit 12 obtains a corresponding function from the plug-in 22 to display the GUI related to the plug-in on a display monitor.

Based on saving target information 19 stored in the storage medium, the setting saving unit 13 saves a setting input by the user via the GUI as the above-described DEVMODE structure. Based on function information 20 stored in the storage medium, the setting management unit 14 manages a setting item which is to be displayed on the GUI of the printer driver, and a setting value of which is to be obtained in response to an operation of the user as a function of the core driver 11. Moreover, based on the plug-in information 21 stored in the storage medium, the setting management unit 14 manages a setting item which is to be displayed on the GUI of the printer driver, and a setting value of which is to be obtained in response to the operation of the user as a function of the plug-in 22. In other words, the screen display unit 12, the setting saving unit 13, and the setting management unit 14 function as the UI unit 10a shown in FIG. 1.

The drawing unit 15 executes a drawing function which is included as a function of the core driver 11. The drawing function here is a function which generates data of the above-described PDL format. Moreover, based on the plug-in information 21, the drawing unit 15 operates a function implemented as the plug-in 22 to execute drawing. In other words, the drawing unit 15 functions as the graphic unit 10b shown in FIG. 1. The function table decrypting unit 16 and the decrypting key 17 are described below.

The plug-in 22 includes a screen display unit 23, a setting management unit 24, a drawing unit 25, and a function table encrypting unit 26. In the present embodiment, the plug-in 22 is implemented as one DLL file. The screen display unit 23 provides a function to be added as a plug-in to the screen display unit 12 of the core driver 11. The setting management unit 24 provides a function to be added as a plug-in to the setting management unit 14 of the core driver 11. The drawing unit 25 provides a function to be added as a plug-in to the drawing unit 15 of the core driver 11.

Figure 4:
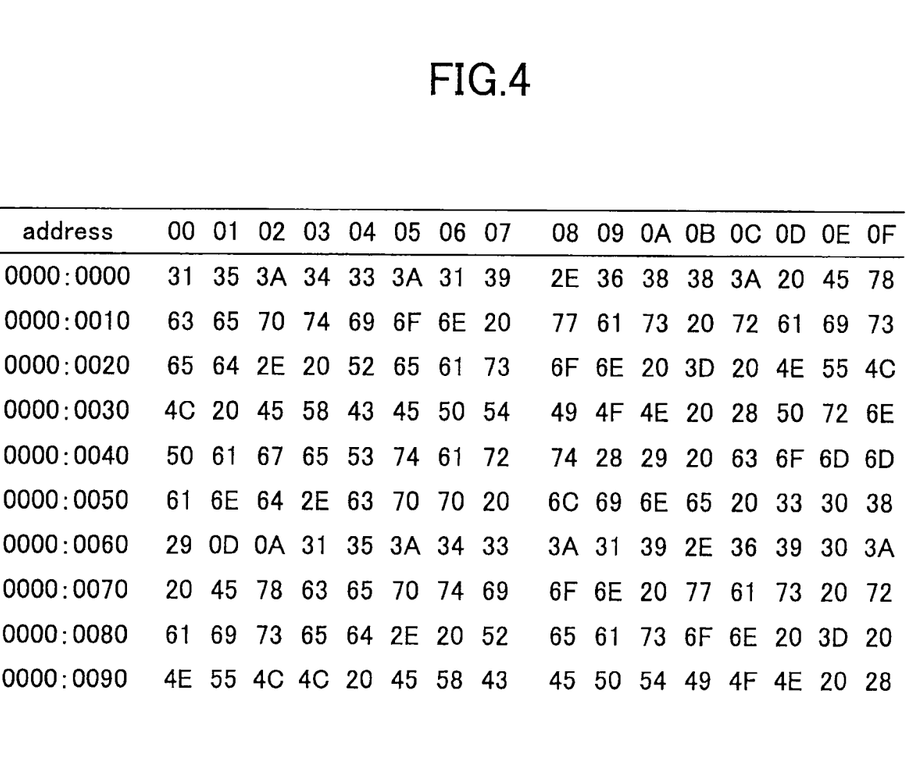
FIG. 4 is a diagram illustrating an example of binary data including an encrypted interface function table, according to the embodiment of the present invention.

Using an encrypting key 27 which is stored in the storage medium, the function table encrypting unit 26 encrypts an interface function table provided from the plug-in 22 side for each of the screen display unit 23, the setting management unit 24, and the drawing unit 25 to be called from the core driver 11 side. FIG. 4 is a diagram illustrating binary data with an interface function table encrypted with the function table encrypting unit 26. As shown in FIGS. 10 and 11, the interface function table is information in which are described rules for causing the screen display unit 23, the setting management unit 24, and the drawing unit 25 to function in a DLL file of the plug-in 22. In other words, the interface function table is extension function operation information for operating an extension function.

The interface function table which is provided to the core driver 11 side after being encrypted on the plug-in 22 side is decrypted by the function table decrypting unit 16 using the decrypting key 17 stored in the storage medium. In this way, the core driver 11 obtains an interface for operating each of the functions implemented as the plug-in 22.

As the decrypting key 17 and an encrypting key 27, a public key scheme may be used, for example. When a public key encrypting scheme is used as the decrypting key 17 and the encrypting key 27, the encrypting key 27 is set to be a private key. In this way, even when a malicious third party creates a malicious DLL file, the encrypting key 27 to be implemented within the DLL file is secret, making it possible to prevent the malicious DLL file from being created.

On the other hand, the encrypting key 27 may be set to be a public key. In this case, the decrypting key 17 is set to be the private key, making it possible to prevent the interface function table from being read by the malicious third party. Even when different keys of the decrypting key 17 and the encrypting keys 27 are produced, it is not necessary to make either one a public key, so that both are generally operated as private keys. In addition, a common key encrypting scheme may be used.

Figure 3:
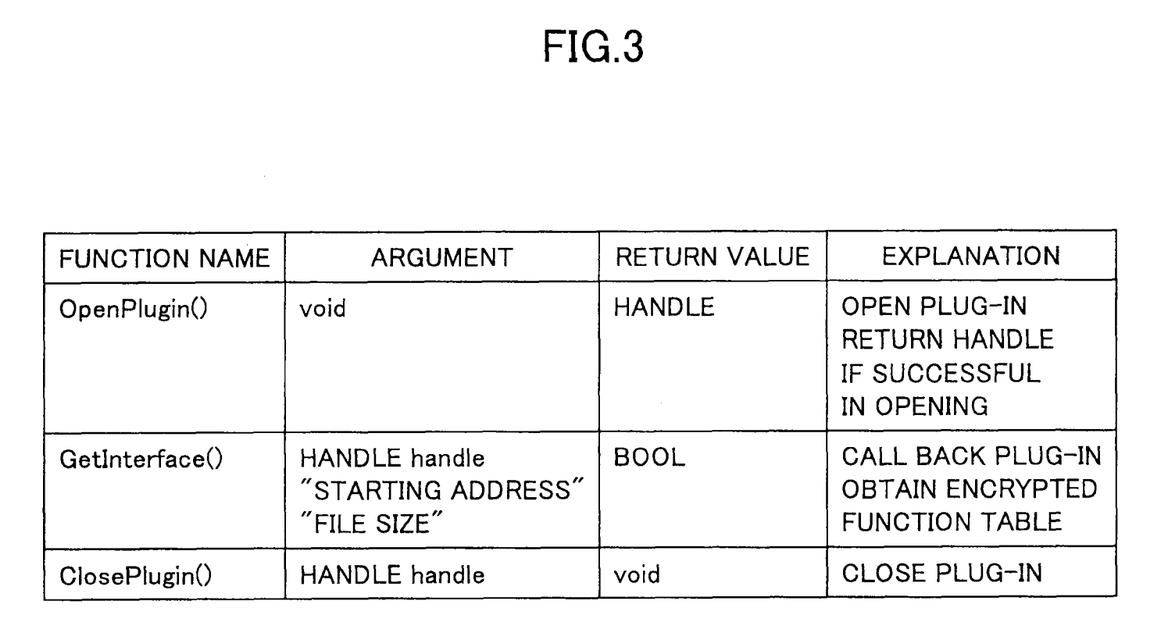
FIG. 3 is a diagram illustrating an example of a plug-in interface according to the embodiment of the present invention.

FIG. 3 is a diagram illustrating a plug interface when the core driver 11 side uses a function of the plug-in 22. As shown in FIG. 3, the "OpenPlugin( )" command and the "ClosePlugin( )" command are the same as the related art shown in FIG. 9. In the same manner as FIG. 9, the "GetInterface( )" command, which is a command for obtaining an interface function table from the plug-in 22 side, is specified with a "starting pointer" and a "file size" which designates a range from which the information is read as arguments.

As shown in an "LPPLUGIN_IF_TBL table", in the related art as shown in FIG. 9, an address of an interface function table included in the DLL file of the plug-in 22 is designated as an argument. However, in the present embodiment, the interface function table is encrypted as shown in FIG. 4 by the function table encrypting unit 26, so that the interface function table cannot be designated by an address of a function.

Thus, in the plug-in interface according to the present embodiment, the "starting pointer" which shows a starting address of an encrypted interface function table and the "file size" of the encrypted interface function table are designated as arguments. In other words, in a command "GetInterface( )" according to the present embodiment, a range from which data is to be obtained out of the encrypted binary data as shown in FIG. 4 is designated. In other words, the "starting address" and the "file size" are used as obtaining range designating information. The core driver 11 obtains the encrypted interface function table from the plug-in 22 according to these arguments.

In this way, the encrypted binary data provided to the core driver 11 side is decrypted by the function table decrypting unit 16, so that the interface function table as shown in FIG. 10 is provided to the core driver 11 side. In this way, the core driver 11 can operate the function of the plug-in 22 using an interface function of the plug-in 22 as shown in FIG. 11.

Figure 5:
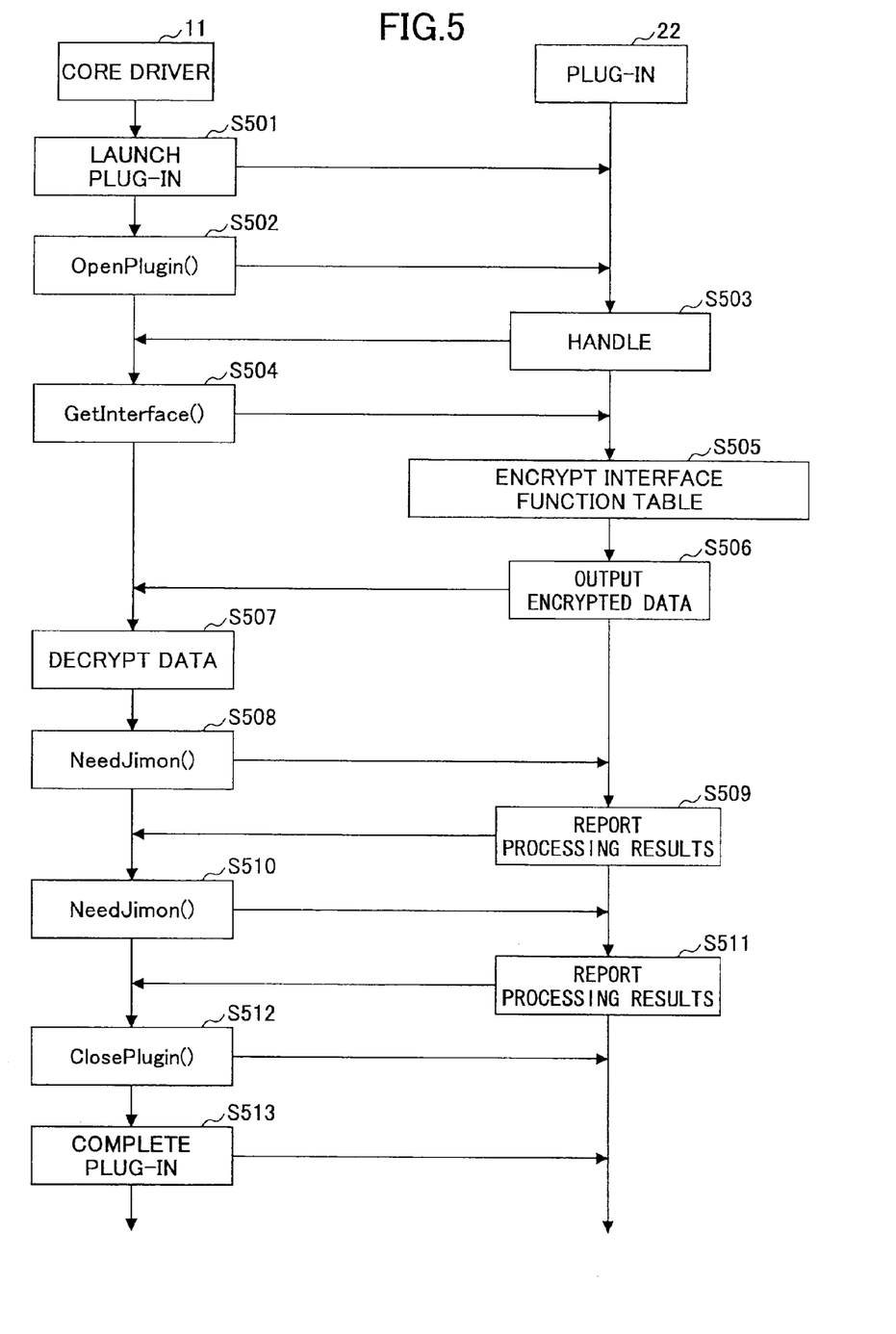
FIG. 5 is a sequence diagram illustrating an operation of the printer driver in the printing system according to the embodiment of the present invention.

FIG. 5 is a sequence diagram showing an operation of the core driver 11 and the plug-in 22 according to the present embodiment. In an example of FIG. 5, an operation of the core driver 11 and the plug-in 22 is described in a process after the image data is transferred to the graphic unit 10b from the GDI 3 which is shown in FIG. 1, or in other words, a process of drawing image data.

As shown in FIG. 5, the core driver 11 (an arithmetic unit which performs arithmetic operations according to the core driver 11), to which the image data is transferred from the GDI 3, first launches the plug-in 22 (S501). In other words, respective modules on the core driver 11 side function as launch process units. The process in S501 is a process of reading a DLL file which makes up the plug-in 22 into a non-volatile storage medium which is a working area.

Then, the core driver 11 starts a plug-in process with an "OpenPlugin( )" command (S502). The plug-in 22 returns HANDLE in response to the "OpenPlugin( )" from the core driver, The core driver 11, which has started the plug-in process, requests the plug-in 22 for an interface function table with the "GetInterface( )" command. In other words, respective modules on the core driver 11 side function as extension function operation information requesting units. When the "GetInterface( )" command is received from the core driver 11, in the plug-in 22, the function table encrypting unit 26 encrypts the interface function table (S505), and outputs, to the core driver 11, binary data of the encrypted interface function table (S506). In other words, the function table encrypting unit 26 functions as an extension function operation information encrypting unit.

In the core driver 11, the function table decrypting unit 16 decrypts encrypted data output from the plug-in 22 side (S507). In other words, the function table decrypting unit 16 functions as an extension function operation information decrypting unit. In this way, the core driver 11 obtains the interface function table, making it possible to utilize an interface function of the plug-in 22.

Then, for example, the core driver 11 causes the plug-in 22 to execute a determination of whether a woven fabric or a letter stamp is needed with "NeedJimon( )" and "NeedWatermark( )" commands and with a setting value saved by the setting saving unit 13 as a DEVMODE structure as an argument (S508, S510). In response thereto, the plug-in 22 reports respective processing results (S509, S511).

The processes in S509 and S511 vary depending on the function implemented by the plug-in 22 or the mode of implementation. For example, for a woven fabric printing function which is implemented by the "NeedJimon( )" command, the process in S509 is a process of determining that woven pattern printing is needed to report the determined results, a process of generating a command for the woven pattern printing that is to be included in a PDL which is finally produced by the core driver 11, or a process of producing vector data and image data for drawing the woven fabric so as to report to the core driver 11.

When a process for an interface function included in the interface function table is completed, the core driver 11 declares completion of a plug-in process with a "ClosePlugin( )" command (S512) and completes use of the plug-in 22 (S513). Subsequently, the drawing unit 15 generates PDL data to be finally transmitted to the printer 8. In other words, the drawing unit 15 functions as a printing control information generating unit. With such a process as described above, an operation of the core driver 11 and the plug-in 22 in a drawing process according to the present embodiment is completed.

In this way, in the printer driver 10 according to the present embodiment, data obtained with the "GetInterface( )" command is an encrypted interface function. Therefore, it is arranged such that a malicious third party cannot easily obtain an interface function.

Moreover, the encrypting key 27 which corresponds to the decrypting key 17 is needed, so that it is also difficult to replace the DLL file which makes up the plug-in 22 with a malicious dummy DLL. Thus, security may be improved for a function which is additionally implemented on the information processing apparatus side in response to functional extension of the image forming apparatus.

Figure 6:
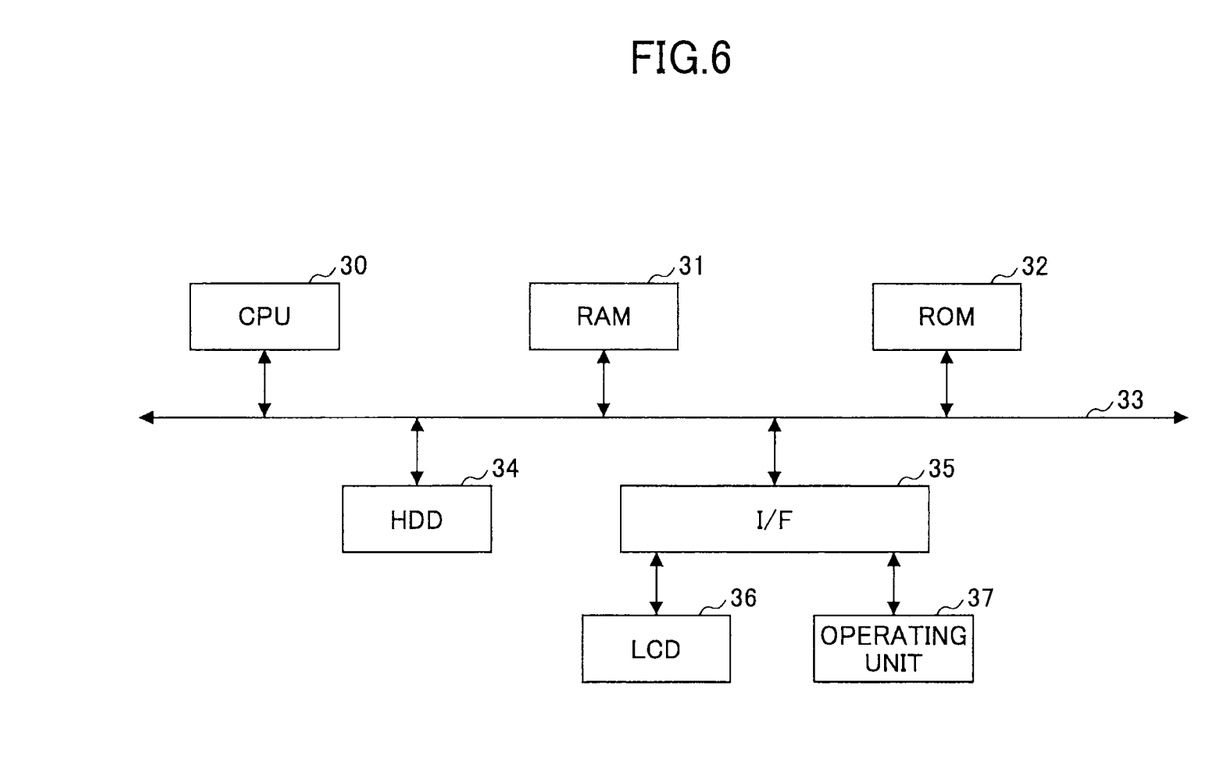
FIG. 6 is a block diagram illustrating a hardware configuration of a PC according to the embodiment of the present invention.

A functional configuration as shown in FIG. 1 or 2 is implemented by a combination of software and hardware. Below, a hardware configuration of the PC 1 according to the present embodiment is described with reference to FIG. 6. As shown in FIG. 6, the PC 1 according to the present embodiment has the same configuration as a common information processing terminal. In other words, in the PC 1 according to the present embodiment, a CPU (Central Processing Unit) 30, a RAM (Random Access Memory) 31, a ROM (Read Only Memory) 32, a HDD (Hard Disk Drive) 34, and an I/F 35 are connected via a bus 33. Moreover, an LCD (Liquid Crystal Display) 36 and an operating unit 37 are connected to the I/F 35.

The CPU 30, which is an operation unit, controls operations of the entire PC 1. The RAM 31, which is a volatile storage medium allowing high-speed reading and writing of information, is used as a work area for the CPU 30 to process the information. The ROM 32, which is a read-only non-volatile storage medium, stores programs of firmware, etc.

The HDD 34, which is a non-volatile storage medium allowing reading and writing of information, stores an OS (Operating System) and various control programs and application programs, etc. The I/F 35 connects the bus 34 and various hardware units and networks, etc. and controls them. The LCD 36 is a visual user interface for the user to confirm the state of the PC 1. The operating unit 37, which includes a keyboard, a mouse, etc., is a user interface for the user to input information into the PC 1.

In such a configuration, programs stored in a recording medium such as the ROM 32, the HDD 34, an optical disk (not shown), etc., are read into the RAM 31 and the CPU 30 performs an arithmetic operation according to these programs to form a software control unit. The thus formed software control unit and the hardware are combined to form a functional block which implements a function of the PC 1 according to the present embodiment as shown in FIGS. 1 and 2.

The printer driver 10 as shown in FIG. 2 is a software program stored in an optical storage medium, etc., having been installed in a HDD 34 of the PC 1. Moreover, as described above, the plug-in 22 includes a DLL file for implementing a function to be additionally implemented having been stored in the HDD 34 of the PC 1 and information on the plug-in interface as shown in FIG. 3 that corresponds to the DLL file stored in the HDD 34 of the PC 1 as the plug-in information 21.

However, a method for installing the printer driver 10 as shown in FIG. 2 is not limited to reading the software program stored in the storage medium into the PC 1, so that it is also possible to implement by downloading the software program into the PC 1 via the network, for example.

In such a case, with an installer program for installing the printer driver 10 being stored in a storage medium provided at the printer 8, the installer program may be downloaded from the printer 8 to the PC 1 to provide the PC 1 with the printer driver 10. In other words, as a distributing form of the printer driver 10 according to the present embodiment, it is possible to use the printer 8 which includes a recording medium on which the printer driver 10 is stored.

Moreover, in the above embodiment, a function as the drawing unit 25 for woven fabric printing, letter stamp printing, etc., is described as an example as shown in FIG. 11 as a function implemented with the plug-in 22. In addition, as the screen display unit 23 and the setting management unit 24, for example, there are a function of displaying a portion for setting a function provided as the plug-in 22 when the UI unit 10a launched by the application 2 shown in FIG. 1 displays the GUI of the printer driver 10 and a function which manages a setting input via the GUI.

As described above, the screen display unit 12, the setting management unit 14, and the drawing unit 15 on the core driver 11 side call and operate the screen display unit 23, the setting management unit 24, and the drawing unit 25, respectively, on the plug-in side 22 based on the plug-in interface as described in FIG. 3. Therefore, when the screen display unit 12, the setting management unit 14, and the drawing unit 15 implement different functions by the screen display unit 23, the setting management unit 24, and the drawing unit 25, respectively, the plug-in 22 side is called based on the respective plug-in interfaces.

In this case, most different are "a starting pointer" and "a file size" which are designated as arguments of the "GetInterface( )" command. In other words, the function table encrypting unit 26 encrypts an interface function within a DLL file so that the plug-in 22 is configured to create binary data, and designation of a portion to be output on the core driver 11 side is changed, so that binary data with an interface function which corresponds to the screen display unit 23, the setting management unit 24, and the drawing unit 25 having been encrypted is output to the core driver 11 side.

In this way, the plug-in interface which differs for each of the screen display unit 12, the setting management unit 14, and the drawing unit 15 is stored as the plug-in information 21. In other words, when the screen display unit 12, the setting management unit 14, and the drawing unit 15 launch and operate the plug-in 22, they refer to the plug-in interface stored in the storage medium as the plug-in information 21 to obtain corresponding interface functions.

Moreover, in the above-described embodiment, an example is described of a case such that the plug-in 22 is configured to have one DLL file. However, the plug-in 22 is to be added for functional extension, so that there may be multiple DLL files. Moreover, the screen display unit 23, the setting management unit 24, and the drawing unit 25 as shown in FIG. 2 may be implemented with different DLL files, or there may be multiple DLL files which function as the drawing unit 25.

In this way, when allowing multiple DLL files to exist, the encrypting key 27 and the function table encrypting unit 26, and information for implementing a function to be extended are included in the respective DLL files. This is because, as the respective DLL files (in practice, CPUs which perform arithmetic operations according to the DLL files) receive a "GetInterface( )" command from the core driver 11 side, the interface function table within the DLL file is encrypted in response to the "GetInterface( )" command, so that an encrypting process may be easily executed due to the function table encrypting unit 26 being implemented within the DLL file.

Moreover, if the multiple DLL files were allowed to exist, the plug-in interface as shown in FIG. 3 would have included information for designating a DLL file for obtaining the interface function.

Moreover, in the above-described embodiment, a case is described such that the function table decrypting unit 16 is implemented as a function of the core driver 11. In this case, a printer driver 10 which includes, as a function on the core driver 11 side, the function table decrypting unit 16 needs to be installed. However, by implementing the function table decrypting unit 16 as a function of the plug-in 22, the function according to the present embodiment can be implemented as long as it is an existing printer driver which is divided into a core driver and a plug-in.

When the function table decrypting unit 16 is implemented as a function of the plug-in 22, a plug-in interface for obtaining an interface function table within a DLL file which implements a function of the function table decrypting unit 16 is stored into the storage medium as the plug-in information 21. Here, as an argument of the "GetInterface( )" command, information which designates an interface function table such as described in FIG. 9, and not a position within the encrypted binary data as shown in FIG. 3, is used.

Then, when a "Getinterface( )" command is received, the DLL file (In practice, a CPU which performs arithmetic operations according to the DLL file) which implements a function of the function table decrypting unit 16 outputs the interface function table as it is to the core driver 11 side without executing the process of encrypting the interface function table as described above.

In this way, on the core driver 11 side, an interface function table is obtained for operating the function table decrypting unit 16 of the plug-in 22, making it possible to decrypt an encrypted interface function table using a function of the function table decrypting unit 16.

A timing of the core driver 11 side requesting an interface function table of the function table decrypting unit 16 includes a timing such that the encrypted interface function table has been obtained, for example.

The present application is based on Japanese Priority Application No. 2011-001196 filed on Jan. 6, 2011, the entire contents of which are hereby incorporated by reference.

The invention claimed is:

1. An information processing apparatus which implements a printing control function for generating printing control information for causing an image forming apparatus to execute printing, the information processing apparatus including a processor having a core unit installed therein and an extension unit which can be added after the core unit has been installed, the information processing apparatus comprising:

the processor having the core unit and the extension unit, the processor being configured to requests, using the core unit, for the extension unit to provide extension function operation information, the extension function operation information including process request information for requesting, by the core unit from the extension unit, a process implemented by the extension unit;

encrypt and output, using the extension unit, the extension function operation information in response to a request from the core unit for the extension function operation information;

decrypt, using the core unit, the encrypted and outputted extension function operation information;

provide to the extension unit a request to perform a process based on the process request information included in the decrypted extension function operation information corresponding to the process to be performed by the extension unit; and generate the printing control information to cause operation of the process implemented by the extension unit, in accordance with the process request, to cause the image forming apparatus to execute printing;

wherein said requesting using the core unit provides a designation of a range to be obtained from in the encrypted extension function operation information, wherein said requesting using the core unit provides a designation of a portion to be obtained in the encrypted extension function operation information based on obtaining range designating information in which is described the range to be obtained from in the encrypted extension function operation information, and wherein said requesting using the core unit provides a designation of the portion to be obtained in the encrypted extension function operation information based on different obtaining range designating information sets according to a timing in a series of operations related to said generating the printing control information.

2. The information processing apparatus as claimed in claim 1, wherein said encrypting using the extension unit encrypts the extension function operation information using a private key in a public key encrypting scheme.

3. The information processing apparatus as claimed in claim 1, wherein said encrypting using the extension unit encrypts the extension function operation information according to information included in the extension unit.

4. The information processing apparatus as claimed in claim 1, wherein said decrypting using the core unit decrypts the encrypted extension function operation information according to information included in the core unit.

5. The information processing apparatus as claimed in claim 1, wherein the processor is configured to obtain, from the extension unit, decrypting function operation information to operate a function which decrypts the encrypted extension function operation information in response to obtaining the encrypted extension function operation information; and operate a function of decrypting the extension function operation information that is implemented in the extension unit based on the obtained decrypting function operation information to decrypt the encrypted extension function operation information, wherein the extension function operation information decrypting unit decrypts the encrypted extension function operation information according to information included in the extension unit.

6. The information processing apparatus as claimed in claim 1, wherein the processor is a hardware processor implemented in processing circuitry, and the processor further includes a launch processing unit that launches the extension unit.

7. A method of implementing, by an information processing apparatus, a printing control function for generating printing control information for causing an image forming apparatus to execute printing, the information processing apparatus including a processor having a core unit installed therein and an extension unit which can be added after the core unit has been installed, the method comprising:

requesting, using the core unit, for the extension unit to provide extension function operation information, the extension function operation information including process request information for requesting, by the core unit from the extension unit, a process implemented by the extension unit;

encrypting and outputting, using the extension unit, the extension function operation information in response to a request from the core unit for the extension function operation information;

decrypting, using the core unit, the encrypted and outputted extension function operation information;

providing to the extension unit a request to perform a process based on the process request information included in the decrypted extension function operation information corresponding to the process to be performed by the extension unit; and generating the printing control information to cause operation of the process implemented by the extension unit, in accordance with the process request, to cause the image forming apparatus to execute printing, wherein said requesting includes providing a designation of a range to be obtained from in the encrypted extension function operation information, wherein said requesting includes providing a designation of a portion to be obtained in the encrypted extension function operation information based on obtaining range designating information in which is described the range to be obtained from in the encrypted extension function operation information, and wherein said requesting includes providing a designation of the portion to be obtained in the encrypted extension function operation information based on different obtaining range designating information sets according to a timing in a series of operations related to said generating of the printing control information.

8. The method as claimed in claim 7, wherein said encrypting includes encrypting the extension function operation information using a private key in a public key scheme.

9. The method as claimed in claim 7, wherein said encrypting is implemented according to information included in the extension unit.

10. The method as claimed in claim 7, wherein said decrypting is implemented according to information included in the core unit.

11. The method as claimed in claim 7, further comprising:
obtaining, from the extension unit, decrypting function operation information to operate a function which decrypts the encrypted extension function operation information in response to obtaining the encrypted extension function operation information; and operating a function of the extension function operation information that is implemented in the extension unit based on the obtained decrypting function operation information to decrypt the encrypted extension function operation information, wherein said decrypting is implemented according to information included in the extension unit.

12. The method as claimed in claim 7, further comprising launching the extension unit using the core unit.

13. A non-transitory computer-readable recording medium storing a program that, when executed by an information processing apparatus, performs a printing control method for generating printing control information for causing an image forming apparatus to execute printing, the information processing apparatus including a core unit installed therein and an extension unit which can be added after the core unit has been installed, the method comprising:

requesting, using the core unit, for the extension unit to provide extension function operation information, the extension function operation information including process request information for requesting, by the core unit from the extension unit, a process implemented by the extension unit;

encrypting and outputting, using the extension unit, the extension function operation information in response to a request from the core unit for the extension function operation information;

decrypting, using the core unit, the encrypted and outputted extension function operation information;

providing to the extension unit a request to perform a process based on the process request information included in the decrypted extension function operation information corresponding to the process to be performed by the extension unit; and generating the printing control information to cause operation of the process implemented by the extension unit, in accordance with the process request, to cause the image forming apparatus to execute printing, wherein said requesting includes providing a designation of a range to be obtained from in the encrypted extension function operation information, wherein said requesting includes providing a designation of a portion to be obtained in the encrypted extension function operation information based on obtaining range designating information in which is described the range to be obtained from in the encrypted extension function operation information, and wherein said requesting includes providing a designation of the portion to be obtained in the encrypted extension function operation information based on different obtaining range designating information sets according to a timing in a series of operations related to said generating of the printing control information.

14. The non-transitory computer-readable recording medium as claimed in claim 13, wherein the method further comprises launching the extension unit using the core unit.

* * * * *